(12) United States Patent
Kanemaru

(10) Patent No.: US 10,705,506 B2
(45) Date of Patent: Jul. 7, 2020

(54) REINFORCEMENT LEARNING TO ALLOCATE PROCESSES TO A MACHINE TOOL CONTROLLER

(71) Applicant: FANUC CORPORATION, Minamitsuru-gun, Yamanashi (JP)

(72) Inventor: Akira Kanemaru, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 111 days.

(21) Appl. No.: 15/981,356

(22) Filed: May 16, 2018

(65) Prior Publication Data

US 2018/0356793 A1 Dec. 13, 2018

(30) Foreign Application Priority Data

Jun. 12, 2017 (JP) .................................. 2017-115221

(51) Int. Cl.
*G06N 3/08* (2006.01)
*G05B 19/404* (2006.01)
(Continued)

(52) U.S. Cl.
CPC ....... *G05B 19/4083* (2013.01); *G05B 13/027* (2013.01); *G05B 19/404* (2013.01);
(Continued)

(58) Field of Classification Search
CPC ..... G06N 3/08; G05B 13/0265; G05B 13/027
See application file for complete search history.

(56) References Cited

U.S. PATENT DOCUMENTS 8,429,097 B1 * 4/2013 Sivasubramanian ... H04L 67/16
706/12
10,140,161 B1 * 11/2018 Singh .................... G06F 9/5083
(Continued)

FOREIGN PATENT DOCUMENTS

CN 106485992 3/2017
CN 106558959 4/2017
(Continued)

OTHER PUBLICATIONS

"VCONF: A Reinforcement Learning Approach to Virtual Machines Auto-configuration," Jia Rao, Xiangping Bu, Cheng-Zhong Xu, Leyi Wang, and George, Yin; ICAC'09, Jun. 15-19, 2009, Barcelona, Spain, pp. 137-146; Copyright 2009 ACM 978-1-60558-564-2/09/06 (Year: 2009).*

(Continued)

*Primary Examiner* — Hal Schnee
(74) *Attorney, Agent, or Firm* — Wenderoth, Lind & Ponack, L.L.P.

(57) ABSTRACT

A machine learning device performs reinforcement learning on a controller that performs multiple processes for controlling a machine tool in parallel at multiple operation units. The machine learning device comprises: behavior information output means that outputs behavior information containing allocation of arithmetic units that perform the multiple processes to the controller; state information acquisition means that acquires state information containing a machining condition as a condition for machining set at the machine tool, and determination information generated by monitoring the implementation of the multiple processes by the multiple operation units based on the allocation in the behavior information; reward calculation means that calculates the value of a reward to be given by the reinforcement learning based on the determination information in the state information; and value function update means that updates
(Continued)

a behavior value function based on the reward value, the state information, and the behavior information.

9 Claims, 11 Drawing Sheets

(51) Int. Cl.
    *G05B 19/408*     (2006.01)
    *G06N 20/00*     (2019.01)
    *G05B 13/02*     (2006.01)
    *G06N 3/00*     (2006.01)

(52) U.S. Cl.
    CPC ............... *G06N 3/006* (2013.01); *G06N 3/08* (2013.01); *G06N 20/00* (2019.01); *G05B 2219/33038* (2013.01); *G05B 2219/33056* (2013.01); *G05B 2219/36456* (2013.01)

(56) References Cited

U.S. PATENT DOCUMENTS

| | | | | |
|---|---|---|---|---|
| 2014/0200706 A1* | 7/2014 | Pruschek | ............... | G05B 17/02 |
| | | | | 700/159 |
| 2015/0378341 A1* | 12/2015 | Kobayashi | ............. | G05B 19/19 |
| | | | | 700/186 |
| 2016/0041849 A1* | 2/2016 | Naveh | ................ | G06Q 30/0207 |
| | | | | 718/104 |
| 2017/0083383 A1* | 3/2017 | Rider | .................... | G06F 9/5094 |
| 2017/0205863 A1* | 7/2017 | Lee | ........................... | G06F 1/28 |

FOREIGN PATENT DOCUMENTS

| | | |
|---|---|---|
| CN | 106560751 | 4/2017 |
| CN | 106815642 | 6/2017 |
| JP | 2000-076087 | 3/2000 |
| JP | 2009-163527 | 7/2009 |
| JP | 2014-35564 | 2/2014 |
| JP | 2015-200947 | 11/2015 |
| JP | 2016-12221 | 1/2016 |
| JP | 2016-51258 | 4/2016 |
| JP | 6114421 | 4/2017 |
| JP | 2017-097664 | 6/2017 |

OTHER PUBLICATIONS

"A Framework for Reinforcement-Based Scheduling in Parallel Processor Systems," Albert Y. Zomaya, Senior Member, IEEE, Matthew Clements, and Stephan Olariu; 1045-9219/98/$10.00 © IEEE (Year: 1998).*

Das, Anup, et al. "Reinforcement learning-based inter-and intra-application thermal optimization for lifetime improvement of multicore systems." Proceedings of the 51st Annual Design Automation Conference. 2014. (Year: 2014).*

* cited by examiner

FIG. 11

| | | MACHINING CONDITION $S_a$ | MACHINING CONDITION $S_b$ | MACHINING CONDITION $S_c$ | MACHINING CONDITION $S_d$ |
|---|---|---|---|---|---|
| PARAMETER SETTING | NUMBER OF CONTROLLED AXES | 12AXIS | 12AXIS | 8AXIS | 12AXIS |
| | NUMBER OF SPINDLES | 2AXIS | 2AXIS | 1AXIS | 1AXIS |
| | EXTENDED AXIS CONTROL FUNCTION | VALID | INVALID | VALID | INVALID |
| | SYNCHRONOUS CONTROL FUNCTION | VALID | VALID | VALID | INVALID |
| | MEMORY DEVICE | MEMORY CARD | MEMORY CARD | USB MEMORY | USB MEMORY |
| OPERATION MODE | | AUTOMATIC OPERATION MODE | AUTOMATIC OPERATION MODE | AUTOMATIC OPERATION MODE | AUTOMATIC OPERATION MODE |
| MACHINING PROGRAM | | O1012 | O1012 | O1012 | O1012 |
| OPERATING STATUS OF CORE (NUMBER OF OPERATING CORES) | | 4 CORES | 4 CORES | 2 CORES | 4 CORES |

REINFORCEMENT LEARNING TO ALLOCATE PROCESSES TO A MACHINE TOOL CONTROLLER

This application is based on and claims the benefit of priority from Japanese Patent Application No. 2017-115221, filed on 12 Jun. 2017, the content of which is incorporated herein by reference.

BACKGROUND OF THE INVENTION

Field of the Invention

The present invention relates to a machine learning device that performs machine learning on a device that performs parallel processing at multiple operation units as a target, a controller, and a computer-readable medium.

Related Art

A controller conventionally known controls a machine tool based on a machining program. For real-time control over the position or speed of each axis in the machine tool, the controller for the machine tool has been required to execute a predetermined control program in a fixed cycle or a fixed period of time.

Meanwhile, in response to a trend in recent years toward a larger number of axes or functions of machine tools, the scale of the control program has been increased to increase throughput considerably. Additionally, to achieve machining at a higher speed with higher accuracy, a cycle of axis control has been required to be shortened. This has brought about the need to increase processing speed in the controller. Further, in addition to the function of axis control, the controller for the machine tool has a communication function, a display function, a signal input/output function, etc. The controller has been required to fulfill all of these functions smoothly.

These requirements have generally been satisfied by using hardware with multiple operation units such as a multiprocessor or multiple cores in the controller for the machine tool, and the processing of control programs in parallel at these multiple operation units. Using the hardware with multiple operation units allows an increase in throughput per unit time by the controller. As a result, more processes can be performed in a shorter period of time.

The foregoing controller of processing the control programs in parallel at the multiple operation units is disclosed by patent document 1, for example. Patent documents 2 to 5 disclose techniques for increasing the efficiency of the parallel processing at multiple operation units. For example, patent document 2 discloses a technique of operating all cores at a uniform ratio by distributing load between operating systems (OSs). Patent document 3 discloses a technique for increasing a cache hit ratio. Patent documents 4 and 5 disclose techniques for increasing throughput per unit time by dividing and distributing processing.

Patent Document 1: Japanese Unexamined Patent Application, Publication No. 2014-35564
Patent Document 2: Japanese Unexamined Patent Application, Publication No. 2009-163527
Patent Document 3: Japanese Unexamined Patent Application, Publication No. 2015-200947
Patent Document 4: Japanese Unexamined Patent Application, Publication No. 2016-012221
Patent Document 5: Japanese Unexamined Patent Application, Publication No. 2016-051258

SUMMARY OF THE INVENTION

As described above, patent documents 2 to 5 disclose the techniques for increasing the efficiency of the parallel processing of the control programs. According to the technique disclosed by patent document 2, all of the cores can be operated at a uniform ratio. However, this technique has difficulty in optimizing the volume of communication between the cores, power consumption by each core, or an amount of heating by each core. According to the techniques disclosed by patent documents 3, 4, and 5, throughput per unit time can be increased. However, these techniques fail to establish an optimal process distribution pattern that is responsive to a machining condition.

As described above, each of the foregoing patent documents discloses a technique of optimizing a particular item. In the field of machine tools required to achieve high real-time performance and operate under a variety of machining conditions, however, the technique of optimizing only a particular item has failed to achieve a significant effect. Even if the techniques of the patent documents are used in combination, establishing a formula for correlation between items in a trade-off relationship has been difficult. Hence, it has been quite difficult to obtain an optimal solution from a massive amount of data.

The present invention is intended to provide a machine learning device, a controller, and a machine learning program for allocating each process (foregoing control program) for controlling a machine tool for an optimal operation unit in response to a machining condition.

(1) A machine learning device according to the present invention (machine learning device 100 described later, for example) performs reinforcement learning on a controller (controller simulator 200 described later, for example) that performs multiple processes for controlling a machine tool in parallel at multiple operation units (first core 241, second core 242, third core 243, fourth core 244 described later, for example). The machine learning device comprises: behavior information output means (behavior information output unit 130 described later, for example) that outputs behavior information containing allocation for an arithmetic unit to perform the multiple processes to the controller; state information acquisition means (state information acquisition unit 110 described later, for example) that acquires state information containing a machining condition as a condition for machining set at the machine tool, and determination information generated by monitoring the implementation of the multiple processes by the multiple operation units based on the allocation in the behavior information; reward calculation means (reward calculation unit 121 described later, for example) that calculates the value of a reward to be given by the reinforcement learning based on the determination information in the state information; and value function update means (value function update unit 122 described later, for example) that updates a behavior value function based on the reward value, the state information, and the behavior information.

(2) In the machine learning device described in (1), the multiple operation units may perform the multiple processes a predetermined number of times in predetermined divided cycles. The value function update means may update the behavior value function each time the multiple processes are finished in the multiple operation units. The behavior information output means may output behavior information containing changed allocation to the controller each time the multiple processes are finished in the multiple operation units.

(3) In the machine learning device described in (2), the allocation in the behavior information may contain designation of a process to be performed by each of the multiple operation units and an order of performing the processes. The behavior information containing changed allocation output from the behavior information output means to the controller may be behavior information in which at least one of the designation of a process to be performed by each of the multiple operation units and the order of performing the processes is changed.

(4) In the machine learning device described in (2) or (3), a process to be allocated for any of the multiple operation units may be fixed. The behavior information containing changed allocation output from the behavior information output means may be behavior information in which the changed allocation pertains to an operation unit for which allocation of a process is not fixed.

(5) In the machine learning device described in any one of (1) to (4), the reinforcement learning by the machine learning device may be performed on the controller as a duplicate virtually made by a simulator. The machine learning device may further comprise optimized behavior information output means (optimized behavior information output unit 150 described later, for example) that generates the behavior information based on state information acquired from a real machine of the controller and a behavior value function learned by the reinforcement learning, and outputs the generated behavior information to the real machine of the controller after the reinforcement learning is finished.

(6) The machine learning device described in (5) may further comprise machining condition change means (machining condition change unit 600 described later, for example). If a machining condition in the state information acquired from the real machine of the controller is a machining condition not having been used as a target of the reinforcement learning, the machining condition change means changes the machining condition to a different machining condition having a partially matching content and having been used as a target of the reinforcement learning. The optimized behavior information output means may generate the behavior information based on state information containing the machining condition changed by the machining condition change means and a behavior value function learned by the reinforcement learning responsive to the different machining condition, and output the generated behavior information to the real machine of the controller.

(7) The machine learning device described in any one of (1) to (6) may further comprise machining condition generation means (machining condition generation unit 500 described later, for example) that generates the machining condition, and sets the generated machining condition at the controller.

(8) A controller that performs multiple processes for controlling a machine tool in parallel at multiple operation units and comprises the machine learning device described in any one of (1) to (7).

(8) A machine learning program according to the present invention causes a computer to function as a machine learning device (machine learning device 100 described later, for example) that performs reinforcement learning on a controller (controller simulator 200 described later, for example) that performs multiple processes for controlling a machine tool in parallel at multiple operation units (first core 241, second core 242, third core 243, fourth core 244 described later, for example). The machine learning device comprises: behavior information output means (behavior information output unit 130 described later, for example) that outputs behavior information containing allocation for an arithmetic unit to perform the multiple processes to the controller; state information acquisition means (state information acquisition unit 110 described later, for example) that acquires state information containing a machining condition as a condition for machining set at the machine tool, and determination information generated by monitoring the implementation of the multiple processes by the multiple operation units based on the allocation in the behavior information; reward calculation means (reward calculation unit 121 described later, for example) that calculates the value of a reward to be given by the reinforcement learning based on the determination information in the state information; and value function update means (value function update unit 122 described later, for example) that updates a behavior value function based on the reward value, the state information, and the behavior information.

According to the present invention, each process for controlling a machine tool can be allocated for an optimal operation unit in response to a machining condition.

BRIEF DESCRIPTION OF THE DRAWINGS

FIG. 11 is a table illustrating an example of a criterion for selecting a similar machining condition according to the second modification of the embodiment of the present invention.

DETAILED DESCRIPTION OF THE INVENTION

Figure 1:
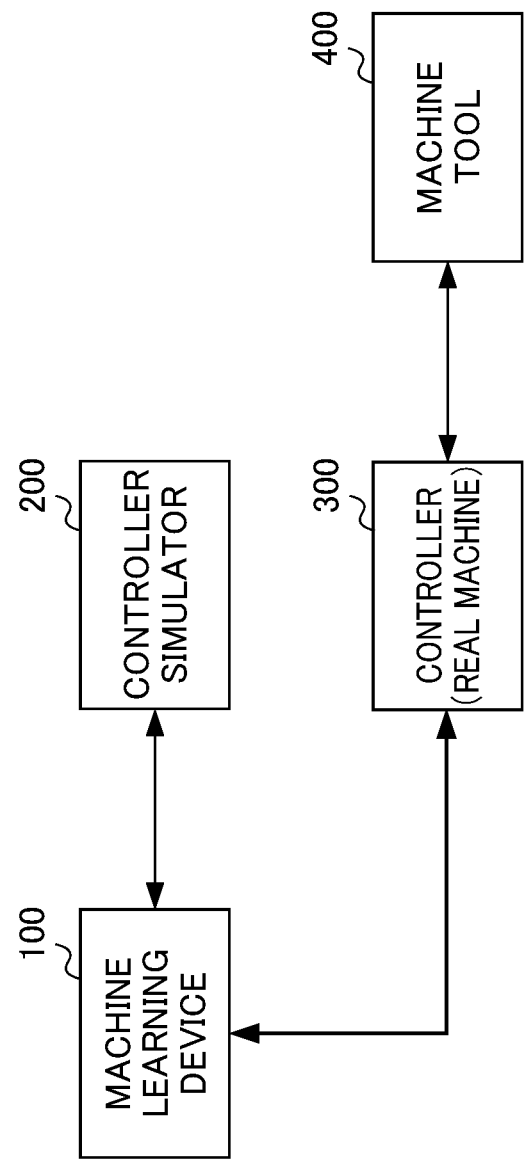
FIG. 1 is a functional block diagram illustrating an overall basic configuration of an embodiment of the present invention.

An embodiment of the present invention will be described in detail by referring to the drawings.

Overall Configuration of Embodiment

FIG. 1 is a functional block diagram illustrating the overall configuration of a machine learning system 1 according to the embodiment. As illustrated in FIG. 1, the machine learning system 1 includes a machine learning device 100, a controller simulator 200, a controller 300, and a machine tool 400.

The machine learning device 100 is a device that performs machine learning on the controller simulator 200 as a target. The machine learning device 100 performs machine learning in a learning phase to obtain a value function for allocating each process for controlling a machine tool for an optimal operation unit in response to a machining condition.

The machine learning device 100 generates behavior information in a running phase for allocating each process for an optimal operation unit based on the value function obtained in the learning phase, and outputs the generated behavior information to the controller 300. As a result of this, the controller 300 is allowed to allocate each process for an optimal operation unit in response to a machining condition to control the machine tool 400 properly. The machine learning device 100 can be fulfilled by a personal computer, a server, or a numerical controller, for example.

The controller simulator 200 is a simulator as a virtual duplicate of the controller 300 made for machine learning. In this embodiment, machine learning is performed on a simulator as a target capable of easily changing a machining condition, etc. during the course of the machine learning. Alternatively, machine learning may be performed on the controller 300 itself as a target. Like the machine learning device 100, the controller simulator 200 can be fulfilled by a personal computer, a server, or a numerical controller, for example.

The controller 300 is a device that performs arithmetic processes in parallel at multiple operation units to control drive of the machine tool 400. The controller 300 performs the arithmetic processes by allocating each process for an optimal operation unit based on the behavior information input from the machine learning device 100. The multiple operation units in the controller 300 can be fulfilled by a processor including multiple cores (multi-core processor) or a numerical controller including multiple processors (multiprocessor). In the drawings, to show that the controller 300 is not a duplicate virtually made, an indication "real machine" is given to the controller 300.

The machine tool 400 is a machine tool to be driven under the control of the controller 300. The machine tool 400 may be replaced by a robot or an industrial machine, for example.

The connection between these devices will be described next. The machine learning device 100 is communicably connected to the controller simulator 200 and the controller 300. The controller 300 and the machine tool 400 are also communicably connected to each other. These communications can be established by a local area network (LAN) constructed in a factory, for example. These communications may be wired communications, wireless communications, or a combination of wired communications and wireless communications, and are free from any particular limitation in terms of communication standards, etc. These communications may be established through a network such as the Internet or a public telephone network (not illustrated in the drawings), for example. In this case, all of the devices may be placed close to each other (in the same factory, for example). Alternatively, these devices may be provided separately at remote places. While each figure illustrates a single device for each type of these devices, there is no limitation on the number of each type of these devices. Additionally, the connection therebetween is not limited to a connection between one device and another but may also be a connection between one device and multiple devices or between multiple devices and multiple devices.

<Functional Block of Controller Simulator 200>

Figure 2:
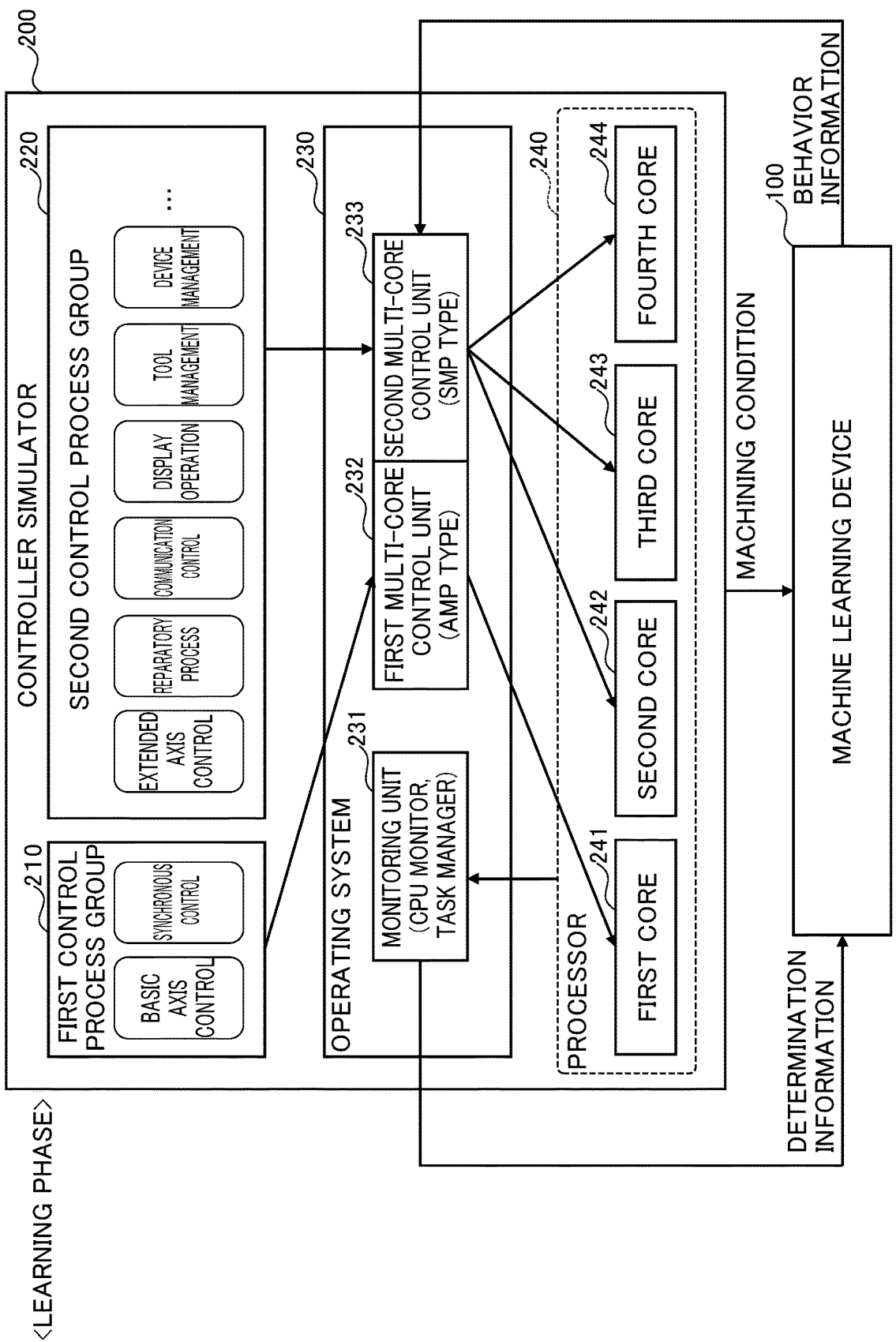
FIG. 2 is a functional block diagram illustrating the configuration of a controller simulator according to the embodiment of the present invention.

Functional blocks in the controller simulator 200 will be described next by referring to FIG. 2. As illustrated in FIG. 2, the controller simulator 200 includes a first control process group 210, a second control process group 220, an operating system 230, and a processor 240.

In this embodiment, a machining program is executed based on a machining condition set by a user. In response to this, multiple control processes corresponding to a particular process or function in the machining program are selected. The first control process group 210 and the second control process group 220 in FIG. 2 correspond to the selected multiple control processes. These multiple control processes are performed by any of the cores in the processor 240 described later.

Control processes in the first control process group 210 are performed by a first core 241 described later. In this embodiment, basic axis control and synchronous control are illustrated as exemplary control processes in the first control process group 210.

The basic axis control is a control process of calculating the strokes of the basic axes (X axis, Y axis, and Z axis used for controlling the machine tool 400, for example). The synchronous control is a control process of calculating the strokes of the synchronous axes (X2 axis, Y2 axis, and Z2 axis used for controlling the machine tool 400, for example) to operate in conjunction with the basic axes. In this way, this embodiment is applicable to a case where axes such as the basic axes and the synchronous axes to be used in synchronization for machining on one workpiece belong to two systems, or three or more systems.

Control processes in the second control process group 220 are performed by any of a second core 242, a third core 243, and a fourth core 244 described later. In this embodiment, extended axis control, preparatory process, communication control, display operation, tool management, and device management are illustrated as exemplary control processes in the second control process group 220.

The extended axis control is a control process of calculating the stroke of an extended axis for attachment and detachment of a workpiece, etc. (loader axis used for controlling the machine tool 400, for example). The preparatory process is a control process of generating an intermediate code for calculating a stroke from a machining program. The communication control is a control process of controlling communication with external equipment (a personal computer or sensors, for example) through Ethernet (registered trademark) or serial communication. The display operation is a control process of generating a display screen of the controller, controlling key input, etc. The tool management is a control process of managing tool information used for machining. The device management is a control process of controlling a device such as a universal serial bus (USB) memory or a secure digital (SD) card, for example.

Each control process in the first control process group 210 or the second control process group 220 allows mutual use of a process with a different control process or the transfer of data to and from a different control process via a predetermined interface. An example of the predetermined interface includes an object-oriented method call and communication by means of transmission and receipt of a command.

Each control process in the first control process group 210 or the second control process group 220 is merely an example. A different control process may be added or each control process may be replaced by a different control process.

The foregoing machining condition is used as part of state information in reinforcement learning described later by the machine learning device 100. For this reason, the machining condition is output from the controller simulator 200 to the machine learning device 100.

The machining condition mentioned herein includes information such as parameter setting, an operation mode, modal information, a machining program, the operating status of processor cores, etc. These pieces of information will be described below.

The parameter setting is information indicating the content of a parameter set based on a machine configuration. A particular example of information in the parameter setting includes a total number of axes in a machine tool, the number of spindles in the machine tool, validity or invalidity of an extended control function, and validity or invalidity of a synchronous control function.

The operation mode is information indicating the content of an operation mode set at a machine tool. A particular example of information in the operation mode is information indicating a mode set at the machine tool selected from an automatic operation mode, a manual operation mode, a program edit mode, etc.

The modal information is information indicating the content of a modal command set at a machine tool. A particular example of information in the modal information is information indicating a mode set as the modal command selected from a cutting mode, a rapid traverse mode, a tapping mode, etc.

The machining program is information indicating a machining program used as a program for controlling a machine tool for machining on a workpiece. A particular example of information in the machining program includes identification information about the machining program, a path of movement of a tool, and information indicating a function group to be used during machining.

The operating status of processor cores is information indicating the operating status of cores. A particular example of information in the operating status of processor cores includes information indicating the number of operating cores and information indicating the operating frequency of a core.

The operating system 230 is an OS that controls the implementation of a control process by the processor 240, etc. The operating system 230 includes a monitoring unit 231, a first multi-core control unit 232, and a second multi-core control unit 233.

The monitoring unit 231 is a unit that monitors the processor 240 to perform a control process. For such monitoring, the monitoring unit 231 has a function as a central processing unit (CPU) monitor or a task manager. The monitoring unit 231 generates determination information based on a monitoring result, and outputs the generated determination information to the machine learning device 100. The determination information is used by the machine learning device 100 as part of the state information during the reinforcement learning described later.

An example of information in the determination information includes the operating ratio of each core in the processor 240, throughput per unit time by each core in the processor 240, the volume of communication between cores in the processor 240, an amount of heating by each core in the processor 240, and the cache hit ratio of each core in the processor 240.

These pieces of information are merely examples. Different information may be added or these pieces of information may be replaced by different information. More detailed information may also be used. It is assumed, for example, that there is an L1 cache accessible at a high speed from a core and an L2 cache accessible at a lower speed than access to the L1 cache but accessible at a higher speed than access to a main memory. In this case, the determination information may contain the cache hit ratio of the L1 cache and the cache hit ratio of the L2 cache distinctively from each other.

The first multi-core control unit 232 and the second multi-core control unit 233 allocate a control process for each core in the processor 240. More specifically, the first multi-core control unit 232 exerts asymmetrical multi-processing (AMP) control of fixing a core to perform a control process. The first multi-core control unit 232 allocates a control process in the first control process group 210 for the first core 241, and makes the first core 241 perform the control process allocated for the first core 241.

By contrast, the second multi-core control unit 233 exerts symmetrical multi-processing (SMP) control of not fixing a core to perform a control process. The second multi-core control unit 233 allocates a control process in the second control process group 220 for any of the second core 242, the third core 243, and the fourth core 244, and makes each core perform the control process allocated to that core. A control process to be allocated by the second multi-core control unit 233 and a core for which the control process is allocated are determined based on behavior information output from the machine learning device 100 to the second multi-core control unit 233. The behavior information is output from the machine learning device 100 during the reinforcement learning described later.

Allocation of a control process includes not only designation of a control process to be performed by each core but also designation of the order of performing the control processes. Allocation mentioned herein means allocation of a control process for the simplification of the description. However, what is actually allocated is one or more independent tasks or threads as a unit in a control process. In this case, to perform a task or a thread properly, a single core is responsible for one task or one thread from the start to the end of the task or thread. In other words, a core responsible for a task or a thread is not changed during the implementation of the task or thread.

The processor 240 includes four cores: the first core 241, the second core 242, the third core 243, and the fourth core 244. Each of these cores performs a control process based on allocation by the first multi-core control unit 232 or the second multi-core control unit 233. The controller simulator 200 is a device that is a virtual duplicate of the controller 300. The processor 240 is a virtual duplicate of a processor in the controller 300 in terms of the number of cores, the operating frequency, etc. In other words, the processor 240 is not limited to the same number of cores as an arithmetic processor actually provided as hardware in the controller simulator 200 or the operating frequency of that arithmetic processor.

In this embodiment, the processor 240 is assumed to be a single processor with multiple cores (multi-core processor). Alternatively, the processor 240 may be fulfilled by multiple processors (multiprocessor). This can be understood by replacing "core" in the description of this embodiment with "processor" appropriately.

The following describes the reason why the first multi-core control unit 232 and the second multi-core control unit 233 employ different control systems in this embodiment. A controller for a machine tool is responsible for a control process to be performed in a fixed cycle or a fixed period of time for achieving real-time control over the position or speed of an axis. If such a control process is allocated freely for a core according to the SMP control system, it may become difficult to perform this control process in the fixed cycle or period of time for sure.

In this regard, the AMP control system and the SMP control system are used in combination in this embodiment. By following the AMP control system of fixing a core to perform a control process for the first control process group 210, a control process required to be performed in a fixed cycle or a fixed period of time is allocated fixedly for a certain core. By doing so, real-time performance of a certain degree can be ensured for this control process.

Meanwhile, by the provision of the second control process group 220 in this embodiment, optimal allocation reflecting the content of machine learning is made by following the SMP control system separately from the allocation of a control process in the first control process group 210. By doing so, effective process distribution can be optimized. In other words, using the two control systems in combination makes it possible to ensure real-time performance of a certain degree and then optimize effective process distribution.

<Implementation of Control Process>

Figure 3:
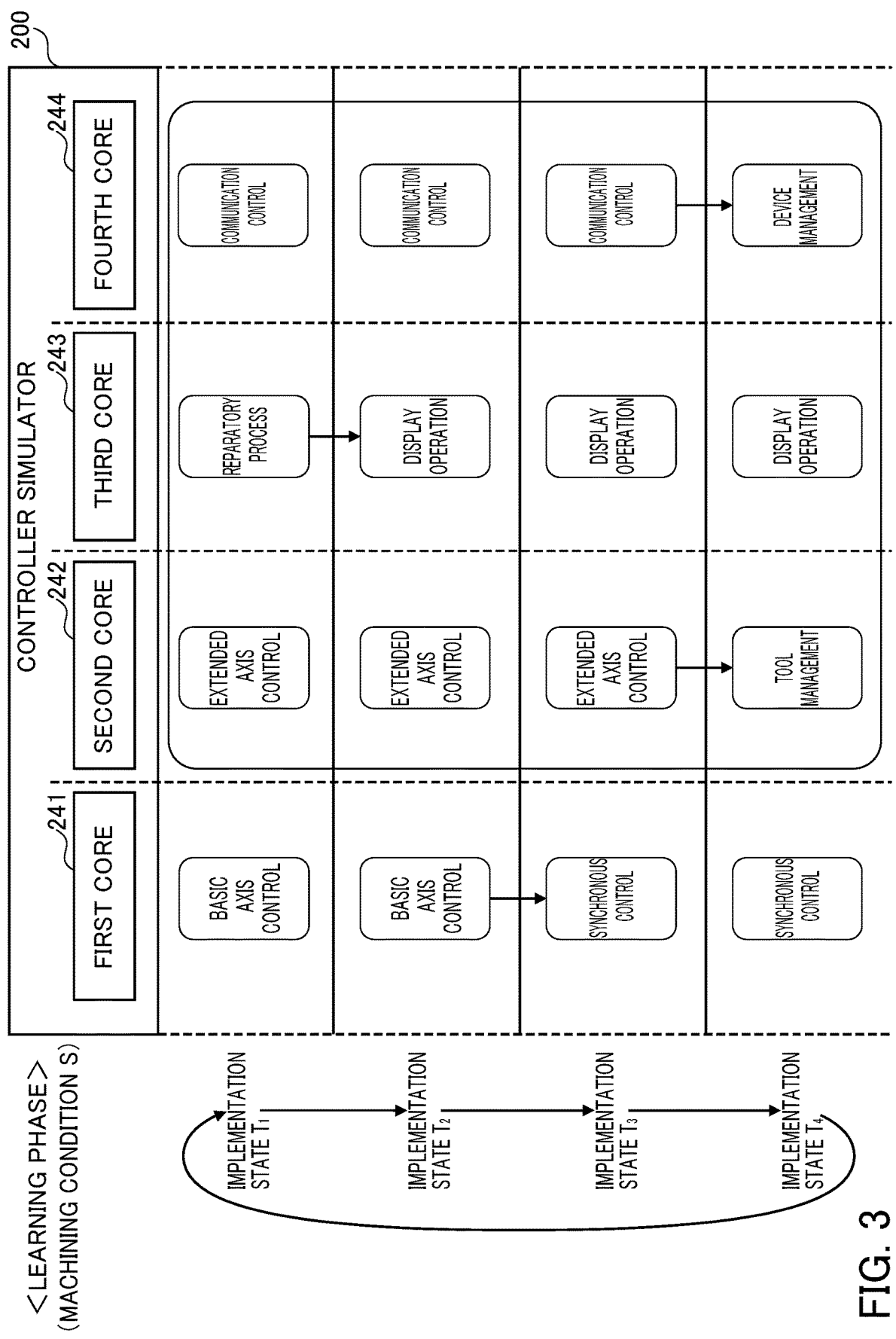
FIG. 3 is a schematic view illustrating allocation of control processes according to the embodiment of the present invention.

The implementation of a control process allocated for each core by the first multi-core control unit 232 and the second multi-core control unit 233 will be described next by referring to FIG. 3. Each core performs control processes allocated for the core a predetermined number of times in divided cycles of a predetermined length. As shown by an implementation state $T_1$, an implementation state $T_2$, an implementation state $T_3$, and an implementation state $T_4$ in FIG. 3, for example, the control processes are performed four times in divided cycles of a predetermined length (some milliseconds, for example).

More specifically, in the implementation state $T_1$, the basic axis control process, the extended axis control process, the preparatory process, and the communication control process are performed by the first core 241 to the fourth core 244 respectively. When the preparatory process is finished in the third core 243, the third core 243 performs the display operation as a next process to make a transition to the implementation state $T_2$. When the basic axis control process is finished in the first core 241, the first core 241 performs the synchronous control process to make a transition to the implementation state $T_3$. When the extended axis control process is finished in the second core 242, the second core 242 performs the tool management process to make a transition to the implementation state $T_4$. When the communication control process is finished in the fourth core 244, the fourth core 244 performs the device management process to make a transition to the implementation state $T_4$. As shown in this example, each control process may be performed in one cycle or across multiple cycles.

As described above, the control process to be allocated for the first core 241 and the order of performing those control processes are fixed. Meanwhile, a control process to be allocated for each of the second core 242, the third core 243, and the fourth core 244, and the order of performing the control processes (corresponding to a section surrounded by dashed lines in FIG. 3) can be changed.

The machine learning device 100 changes a control process to be allocated for each of the second core 242, the third core 243, and the fourth core 244, and the order of performing those control processes (corresponding to a section surrounded by solid lines in FIG. 3) based on behavior information, thereby generating the implementation state $T_1$ to the implementation state $T_4$ repeatedly. The machine learning device 100 regards a period from the implementation state $T_1$ to the implementation state $T_4$ as one state. Each time the state from the implementation state $T_1$ to the implementation state 14 is finished, the machine learning device 100 updates a behavior value function. In this way, the machine learning device 100 performs machine learning. The machine learning will be described in detail below.

<Machine Learning>

In parallel with the foregoing allocation of each control process for a corresponding core and the foregoing implementation of the control process by the core, the machine learning device 100 performs machine learning. For this machine learning, predetermined information is transmitted and received between the machine learning device 100 and the controller simulator 200, as illustrated in FIG. 2. More specifically, a machining condition set by a user is output from the controller simulator 200 to the machine learning device 100. A determination condition generated in the foregoing manner by the monitoring unit 231 is further output from the controller simulator 200 to the machine learning device 100. Further, behavior information is output from the machine learning device 100 to the controller simulator 200. Based on these inputs and outputs, the machine learning device 100 performs reinforcement learning as a part of the machine learning.

Before describing each functional block in the machine learning device 100, a basic mechanism of the reinforcement learning will be described next. In the reinforcement learning, an agent (corresponding to the machine learning device 100 of this embodiment) observes the state of an environment (corresponding to the controller simulator 200 of this embodiment) and selects a certain behavior. Based on this behavior, the environment changes. In response to the change in the environment, some reward is given and the agent performs learning to select a better behavior (decision-making). Supervised learning gives a perfect answer. By contrast, in many cases, a reward to be given by the reinforcement learning is fragmented values based on a partial change in the environment. Thus, the agent performs learning to select a behavior so as to maximize a total reward to be given in the future.

As described above, the reinforcement learning is to learn a proper behavior in consideration of interaction given by the behavior on the environment, specifically, a method of maximizing a reward to be given in the future. In this embodiment, this means the capability to allocate each process for controlling a machine tool for an optimal core in response to a machining condition, which is the capability to acquire a behavior to affect the future.

Any learning method is applicable to the reinforcement learning. Q-learning is used as an example in the following description. The Q-learning is a method of learning a value $Q(s, a)$ for selecting a behavior a in a certain state s of the environment. The Q-learning is intended to select a behavior a of the highest value $Q(s, a)$ from feasible behaviors a in the certain state s.

When the Q-learning is started at first, however, a correct value of the value Q(s, a) is completely unknown for combinations of a state s and a behavior a. Then, the agent selects various behaviors a in a certain state s and selects a better behavior based on a reward to be given for this behavior a. In this way, the agent continues learning correct values Q(s, a).

To satisfy a desire to maximize a total reward to be given in the future, a goal is to eventually satisfy $Q(s, a)=E[\Sigma(\gamma^t) r_t]$. Here, E[ ] is an expected value, t is time, $\gamma$ is a parameter called a discount rate described later, $r_t$ is a reward at time t, and $\Sigma$ is a total at the time t. An expected value obtained from this formula is an expected value resulting from a change of state generated by an optimal behavior. However, an optimal behavior is unknown during the course of the Q-learning. Thus, during the reinforcement learning, various behaviors are taken to find an optimal behavior. A formula of updating the value Q(s, a) can be expressed as the following formula (formula shown as [Formula 1] below), for example.

$$Q(s_{t+1}, a_{t+1}) \leftarrow Q(s_t, a_t) + \alpha\left(r_{t+1} + \gamma \max_a Q(s_{t+1}, a) - Q(s_t, a_t)\right)$$ [Formula 1]

In the foregoing formula shown as [Formula 1], $s_t$ is the state of the environment at time t, and at is a behavior at the time t. A state is changed to $s_{t+1}$ by the behavior $a_t$. Further, $r_{t+1}$ is a reward given by this change of state. A term with max shows a value obtained by multiplying a Q value by $\gamma$. This Q value is determined by selecting a behavior a known to result in the highest Q value in the state $s_{t+1}$. Here, $\gamma$ is a parameter in a range of $0<\gamma\leq 1$ and is called a discount rate. Further, a is a learning coefficient and is in a range of $0<\alpha\leq 1$.

The foregoing [Formula 1] shows a method of updating a value $Q(s_t, a_t)$ of the behavior $a_t$ in the state $s_t$ based on the reward $r_{t+1}$ given in response to doing the behavior $a_t$ tentatively. This update formula shows that, if a best behavior value $\max_a Q(s_{t+1}, a)$ determined by the behavior $a_t$ in the subsequent state $s_{t+1}$ becomes larger than a value $Q(s_t, a_t)$ determined by the behavior at in the state $s_t$, $Q(s_t, a_t)$ is increased. Conversely, if the best behavior value $\max_a Q(s_{t+1}, a)$ is smaller than the value $Q(s_t, a_t)$, $Q(s_t, a_t)$ is reduced. In other words, the value of a certain behavior in a certain state is approximated to a best behavior value determined by the same behavior in a subsequent state. A difference between these values is changed by a way of determining the discount rate $\gamma$ and the reward $r_{t+1}$. Meanwhile, the basic mechanism is such that a best behavior value in a certain state is propagated to a behavior value in a state previous to the state of the best behavior value.

The Q-learning method may be performed by a learning method of generating a table of Q(s, a) about all pairs (s, a) of states and behaviors. As a result of too many states, however, obtaining Q(s, a) values for all pairs Q(s, a) of states and behaviors and converging the Q-learning takes much time.

In this regard, a publicly-known technique called Deep Q-Network (DQN) may be used. More specifically, the value Q(s, a) may be calculated by constructing a value function Q using an appropriate neural network, adjusting the parameters of the neural network, and approximating the value function Q using an appropriate neural network. Using the DQN can shorten the time required for converging the Q-learning. Non-patent document described later describes the DQN in detail, for example.

<Non-Patent Document 1>

"Human-level control through deep reinforcement learning," Written by Volodymyr Mnih, Searched online on Jun. 1, 2017 via the Internet <URL: http://files.davidqi-u.com//research/nature14236.pdf>

The machine learning device 100 performs the Q-learning described above. More specifically, the machine learning device 100 observes a state as an environmental state s specified based on a machining condition output from the controller simulator 200 and determination information output from the controller simulator 200, and selects adjustment of a core for which a control process is to be allocated and the order of performing the control processes in the environmental state s as a behavior a, thereby learning the value Q. For the learning of the value Q, each time the behavior a is done, the machine learning device 100 calculates a reward. The machine learning device 100 finds an optimal behavior a by trial and error so as to maximize a total reward to be given in the future, for example. By doing so, the machine learning device 100 is allowed to select the behavior a optimal for the environmental state s.

In this way, the machine learning device 100 learns the value function Q. Based on the learned value function Q, the machine learning device 100 selects a behavior a to maximize the value of Q from behaviors a to be applied to the allocation of each control process for a core in a certain state s. By doing so, each control process can be allocated for an optimal core that is responsive to a machining condition.

<Functional Block of Machine Learning Device 100>

Figure 4:
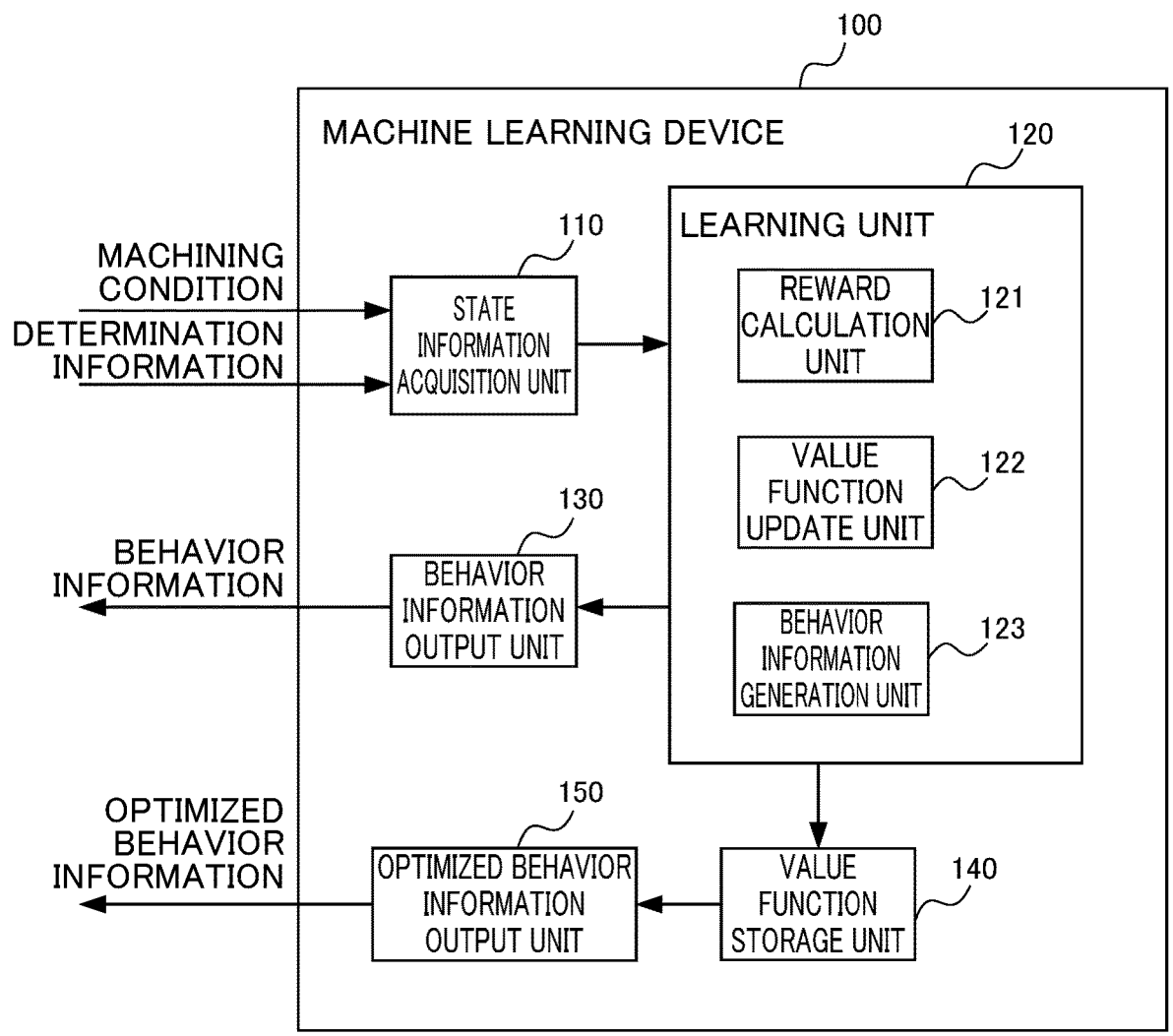
FIG. 4 is a functional block diagram illustrating the configuration of a machine learning device according to the embodiment of the present invention.

The following describes functional blocks in the machine learning device 100 that performs the foregoing reinforcement learning by referring to FIG. 4. As illustrated in FIG. 4, the machine learning device 100 includes a state information acquisition unit 110, a learning unit 120, a behavior information output unit 130, a value function storage unit 140, and an optimized behavior information output unit 150. The learning unit 120 includes a reward calculation unit 121, a value function update unit 122, and a behavior information generation unit 123.

The state information acquisition unit 110 acquires state information s from the controller simulator 200 containing a machining condition set at the controller simulator 200 and determination information generated based on a result of monitoring by the monitoring unit 231. The state information s corresponds to the environmental state s in the Q-learning. The state information acquisition unit 110 outputs the acquired state information s to the learning unit 120.

The learning unit 120 is a unit that learns a value Q(s, a) responsive to selection of a certain behavior a in a certain environmental state s. For this learning, the learning unit 120 includes the reward calculation unit 121, the value function update unit 122, and the behavior information generation unit 123.

The reward calculation unit 121 is a unit that calculates a reward responsive to the selection of the behavior a in the certain state s. A reward is given based on a determination to be made using the determination information in the state information s. Any determination condition is applicable. As examples of the determination condition, determination conditions from a determination condition 1 to a determination condition 5 are described below.

Determination condition 1: a determination based on a difference in operating ratio between cores (an average of differences in operating ratio between cores, for example)

If a difference in operating ratio is large, a reward is decreased. If a difference in operating ratio is small, a reward is increased.

Determination condition 2: a determination based on throughput per unit time (an average of throughputs of all cores per unit time, for example)

If throughput is high, a reward is increased. If throughput is low, a reward is decreased.

Determination condition 3: a determination based on the volume of communication between cores (total volume of communication between all cores, for example)

If a communication volume is large, a reward is decreased. If a communication volume is small, a reward is increased.

Determination condition 4: a determination based on power consumption or an amount of heating (maximum power consumption or a maximum amount of heating in all core, for example)

If power consumption or an amount of heating is large, a reward is decreased. If power consumption or an amount of heating is small, a reward is increased.

Determination condition 5: a determination based on a cache hit ratio (a total of cache hit ratios of all cores, for example)

If a cache hit ratio is high, a reward is increased. If a cache hit ratio is low, a reward is decreased.

The reward calculation unit 121 may calculate a reward based on one, or two or more of these determination conditions. For calculation based on two or more determination conditions, a total may be obtained by combining an increase or a decrease in rewards calculated based on the corresponding determination conditions. In this case, a total may be obtained by adding weight to an increase or a decrease in a reward calculated based on a corresponding determination condition, and combining the resultant increase or decrease. If importance is placed on reducing power consumption, for example, a heavy weight may be given to an increase or a decrease in a reward calculated based on the foregoing determination condition 4.

An increase or a decrease in a reward calculated based on a corresponding determination condition may be increased or decreased in response to an extent of fulfillment of that condition. In the case of the foregoing determination condition 1, for example, the value of a decrease in a reward may be increased with a larger difference in operating ratio. Further, the value of an increase from a reward may be increased with a smaller difference in operating ratio.

As described above, in this embodiment, control processes are performed a predetermined number of times in divided cycles of a predetermined length. An average or a maximum of determination information pieces corresponding to the predetermined number of times may be calculated. Then, by checking the calculated value and the determination condition against each other, a reward responsive to selection of a behavior a in a certain state s may eventually be calculated. Alternatively, by checking determination information corresponding to each predetermined cycle against a determination condition, an increase or a decrease in a reward may be calculated and stored. By combining the stored increase or decrease in a reward corresponding to the predetermined number of times, a reward responsive to selection of a behavior a in a certain state s may eventually be calculated.

The value function update unit 122 performs the Q-learning based on a state s, a behavior a, a state s' determined by applying the behavior a to the state s, and the reward value calculated by the foregoing manner, thereby updating the value function Q stored in the value function storage unit 140.

The value function Q may be updated by online learning, batch learning, or mini-batch learning. Online learning is a learning method by which, each time a transition is made from a state s to a new state s', the value function Q is updated immediately. Batch learning is a learning method by which a certain behavior a is applied to a current state s to make a transition from the state s to a new state s'. This transition is made repeatedly to collect learning data. The value function Q is updated using all pieces of the collected learning data. Mini-batch learning is an intermediate learning method between the online learning and the batch learning. According to this method, each time learning data of a certain volume is accumulated, the value function Q is updated.

The behavior information generation unit 123 selects the behavior a at random during the course of the Q-learning in a current state s. During the course of the Q-learning, to designate a core to perform each control process and change the order of performing those control processes (corresponding to the behavior a in the Q-learning), the behavior information generation unit 123 generates behavior information a and outputs the generated behavior information a to the behavior information output unit 130. More specifically, the behavior information generation unit 123 changes at least one or more of the designation of a core to perform each control process and the order of performing those control processes in the behavior a, and outputs the resultant information.

The behavior information generation unit 123 may take a measure to select a behavior a at random. The behavior information generation unit 123 may also take a measure to select a behavior a by a publicly-known method such as the greedy method of selecting a behavior a of the highest value Q(s, a) from the values of behaviors a currently assumable, or the ε-greedy method of selecting a behavior a at random at a low probability ε and selecting a behavior a of the highest value Q(s, a) in the other cases.

The behavior information output unit 130 is a unit that transmits the behavior information a output from the learning unit 120 to the second multi-core control unit 233 of the controller simulator 200. As described above, based on this behavior information a, the second multi-core control unit 233 corrects a current state s, specifically, designation of a core to perform each control process currently-allocated and the order of performing those control processes, thereby making a transition to a next state s' (specifically, corrected designation of a core to perform each control process and corrected order of performing those control processes).

The value function storage unit 140 is a storage device that stores the value function Q. The value function Q may be stored for each state s or each behavior a in a table. The value function Q stored in the value function storage unit 140 is updated by the value function update unit 122. The value function Q stored in the value function storage unit 140 may be shared with a different machine learning device 100. Sharing the value function Q between multiple machine learning devices 100 allows the implementation of reinforcement learning in a distributed manner in each machine learning device 100. Thus, the efficiency of the reinforcement learning can be increased.

Based on the value function Q updated by implementing the Q-learning by the value function update unit 122, the optimized behavior information output unit 150 generates behavior information a (hereinafter called "optimized behavior information") containing designation of a core to perform each control process and the order of performing those control processes to maximize the value Q(s, a).

More specifically, the optimized behavior information output unit 150 acquires the value function Q stored in the value function storage unit 140. As described above, this value function Q results from an update by implementing the Q-learning by the value function update unit 122. Then, based on the value function Q and a machining condition set at the controller 300, the optimized behavior information output unit 150 generates optimized behavior information, and outputs the generated optimized behavior information to the controller 300. Like behavior information output by the behavior information output unit 130 during the course of the Q-learning, this optimized behavior information contains designation of a core to perform each control process and the order of performing those control processes.

Based on this optimized behavior information, the controller 300 corrects designation of a core to perform each control process and the order of performing those control processes. As described above, by using the machine learning device 100, designation of a core to perform each control process and the order of performing those control processes in the controller 300 can be optimized.

<Functional Block of Controller 300>

Figure 5:
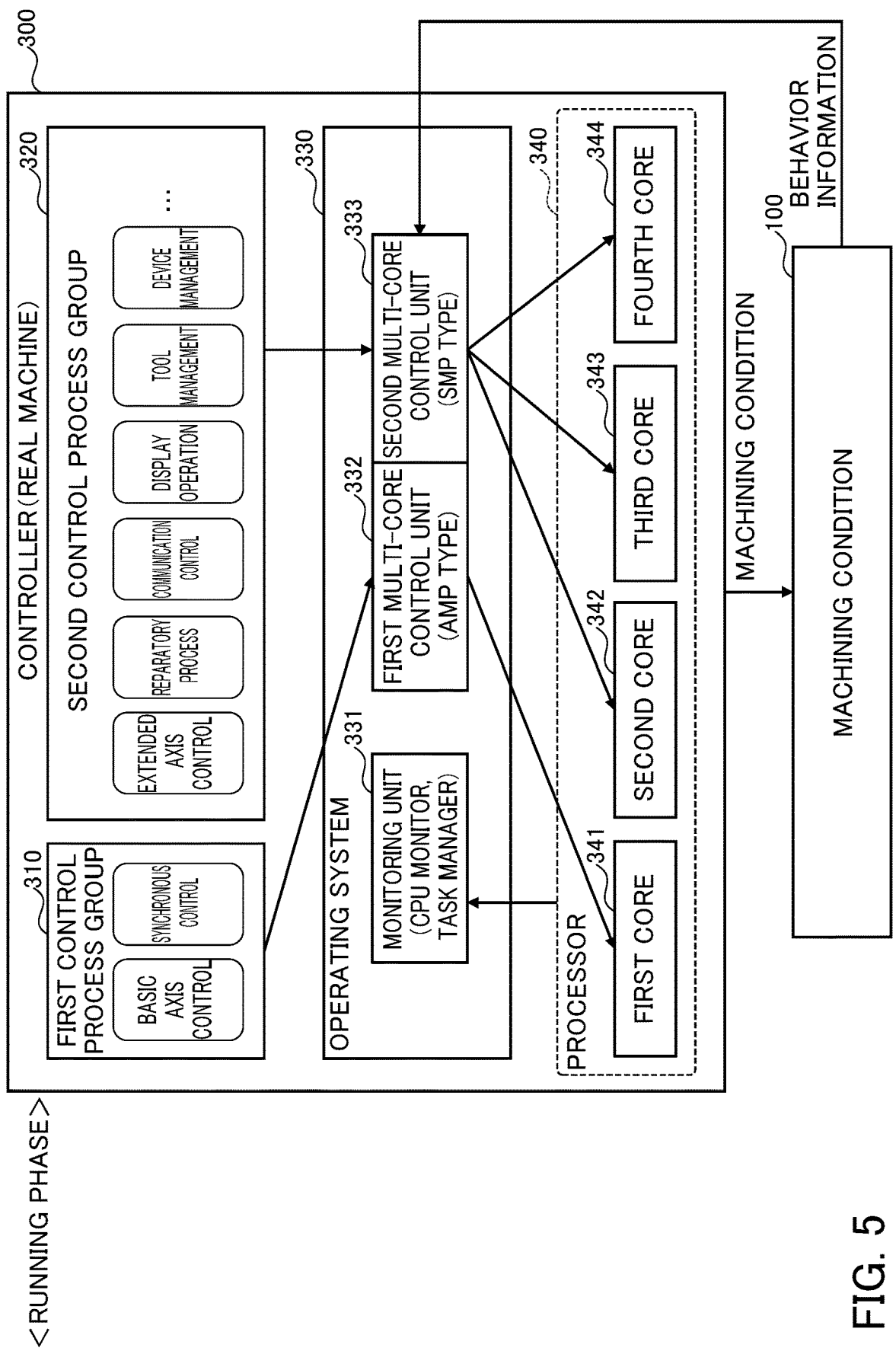
FIG. 5 is a functional block diagram illustrating the configuration of a controller according to the embodiment of the present invention.

The functional block of the controller 300 will be described next by referring to FIG. 5. The controller simulator 200 described above is a simulator in which the function of the controller 300 is duplicated virtually. Thus, the controller 300 has a comparable function to the controller simulator 200. In other words, the function of the controller 300 can be understood by applying the description of each functional block given in the foregoing description of the controller simulator 200 to a functional block with the same name in the controller 300. Thus, an overlapping description will not be given in this section. A machining condition comparable to the machining condition set at the controller simulator 200 is set at the controller 300. The details of a machining condition have been given in the foregoing description of the controller simulator 200. Thus, an overlapping description will not be given in this section.

Meanwhile, in this embodiment, the controller 300 differs from the controller simulator 200 in that the controller 300 is not a target of machine learning in the learning phase but is a control target in the running phase. Thus, as illustrated in FIG. 5, a monitoring unit 331 of the controller 300 is not required to output determination information to the machine learning device 100. Additionally, information to be output from the machine learning device 100 is not behavior information to be output by trial and error during the machine learning, but optimized behavior information to be output based on a result of the machine learning.

The functional blocks in the machine learning device 100, those in the controller simulator 200, and those in the controller 300 have been described above. To fulfill these functional blocks, each of the machine learning device 100, the controller simulator 200, and the controller 300 includes an arithmetic processor such as a CPU. Each of the machine learning device 100, the controller simulator 200, and the controller 300 further includes an auxiliary storage device such a hard disk drive (HDD) for storing various control programs such as application software and an OS, and a main storage device such as a random access memory (RAM) for storing data that is temporarily required when the arithmetic processor executes a program.

In each of the machine learning device 100, the controller simulator 200, and the controller 300, the arithmetic processor reads the application software and the OS from the auxiliary storage device, and expands the read application software and OS in the main storage device to perform arithmetic processing based on the expanded application software and OS. The arithmetic processor also controls various types of hardware provided in each device based on a result of the arithmetic processing. As a result, the functional blocks of this embodiment are fulfilled. In other words, this embodiment can be fulfilled by hardware and software working cooperatively. A program for fulfilling this embodiment can be stored using various types of non-transitory computer-readable media and can be supplied to a computer. The non-transitory computer-readable media include various types of tangible storage media.

The machine learning device 100 is to handle a large amount of arithmetic processing accompanying the machine learning. In this regard, mounting graphics processing units (GPUs) on a personal computer, and using the GPUs for arithmetic processing the accompany the machine learning using a technique called general-purpose computing on graphics processing units (GPGPUs), may be a preferable way to achieve high-speed processing. Additionally, for higher-speed processing, a computer cluster may be constructed by using multiple computers with these GPUs, and parallel processing may be performed at the multiple computers in this computer cluster.

Operation in this Embodiment

Figure 6:
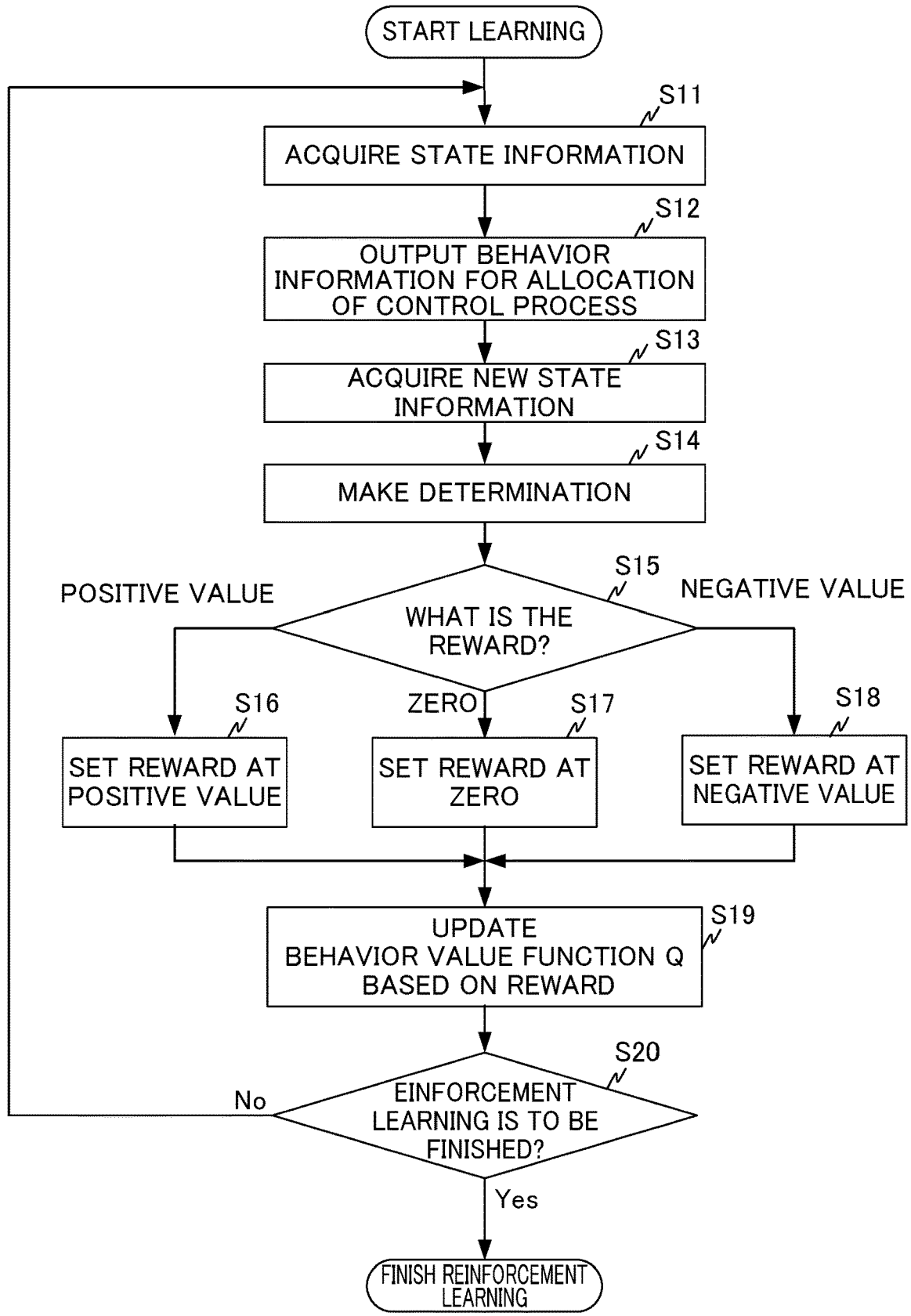
FIG. 6 is a flowchart explaining the operation of the machine learning device in a learning phase according to the embodiment of the present invention.

The following describes the operation of the machine learning device 100 of this embodiment when the machine learning device 100 performs the Q-learning by referring to the flowchart in FIG. 6.

In step S11, the state information acquisition unit 110 acquires state information s from the controller simulator 200. The acquired state information is output to the value function update unit 122 and the behavior information generation unit 123. As described above, the state information s corresponds to the environmental state s in the Q-learning, and contains a machining condition set at the controller simulator 200 and determination information generated based on a result of monitoring by the monitoring unit 231 at the time of step S11.

In step S12, the behavior information generation unit 123 generates new behavior information a and outputs the generated new behavior information a via the behavior information output unit 130 to the second multi-core control unit 233 of the controller simulator 200. The behavior information generation unit 123 outputs the new behavior information a by taking the foregoing measure. After the second multi-core control unit 233 receives the behavior information a, the second multi-core control unit 233 makes each core perform a control process by following the designation of a core to perform each control process in a current state s and a state s' in which the order of performing those control processes is corrected based on the received behavior information. As described above, this behavior information corresponds to the behavior a in the Q-learning.

In step S13, the state information acquisition unit 110 acquires state information s' in the new state s' from the controller simulator 200. In this embodiment, a machining condition set at the controller simulator 200 is not changed during the course of the reinforcement learning. In other words, a machining condition remains the same in step S11 and step S13. Thus, as long as the state information s' contains determination information generated based on a result of monitoring by the monitoring unit 231, a machining condition may be omitted from the state information s'. In this case, the state information acquisition unit 110 may add the machining condition already acquired in step S11 to the state information s'. The acquired state information s' is output to the reward calculation unit 121.

In step S14, the reward calculation unit 121 makes a determination based on the determination information in the state information s'. The reward calculation unit 121 makes the determination by the foregoing method described in the section titled <Functional block of machine learning device 100>.

In step S15, it is determined whether a reward eventually takes a positive value, a negative value, or zero as a result of the determination made based on each determination condition in step S14 that the reward is to be increased or decreased.

If the reward takes a positive value, a determination "positive value" is made in step S15. Then, the processing proceeds to step S16. In step S16, the positive value is output as the reward to the value function update unit 122. If the reward takes zero, a determination "zero" is made in step S15. Then, the processing proceeds to step S17. In step S17, zero is output as the reward to the value function update unit 122. If the reward takes a negative value, a determination "negative value" is made in step S15. Then, the processing proceeds to step S18. In step S18, the negative value is output as the reward to the value function update unit 122. If any of step S16, step S17, and step S18 is finished, the processing proceeds to step S19.

In step S19, based on the reward value output from any of step S16, step S17, and step S18, the value function update unit 122 updates the value function Q stored in the value function storage unit 140. While the update in step S19 is described as an online update, this online update may be replaced by a batch update or a mini-batch update.

In step S20, the learning unit 120 determines whether or not a condition for finishing the reinforcement learning has been satisfied. The reinforcement learning is to be finished on the condition that the foregoing processes have been repeated a predetermined number of times or repeated for a predetermined period of time, for example. If the condition for finishing the reinforcement learning has not been satisfied, the determination made in step S20 is No. Then, the processing returns to step S11. Then, the foregoing processes are repeated to converge the value function Q to a proper value. If the condition for finishing the reinforcement learning has been satisfied, the determination made in step S20 is Yes. Then, the processing is finished.

As a result of the operation described above by referring to FIG. 6, a value function for optimizing designation of a core to perform each control process and the order of performing those control processes can be obtained in this embodiment by the use of the machine learning device 100.

Figure 7:
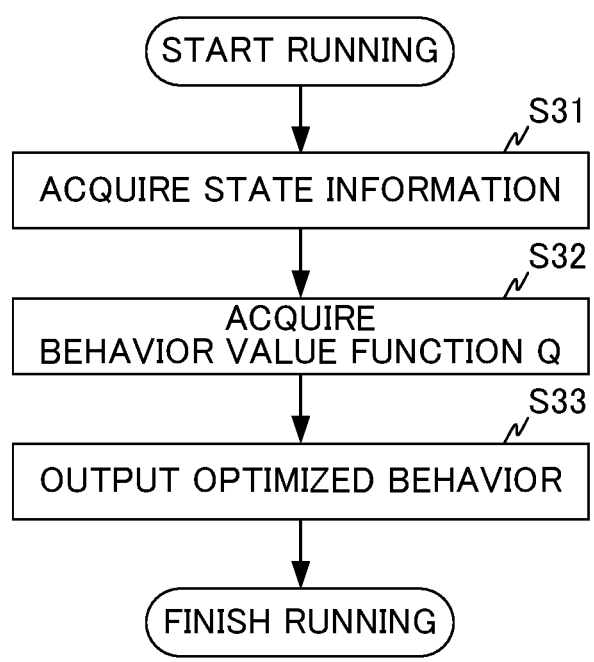
FIG. 7 is a flowchart explaining the operation of the machine learning device in a running phase according to the embodiment of the present invention.

The following describes the operation of the optimized behavior information output unit 150 when the optimized behavior information output unit 150 generates optimized behavior information by referring to the flowchart in FIG. 7. First, in step S31, the state information acquisition unit 110 acquires state information s from the controller 300.

In step S32, the optimized behavior information output unit 150 acquires the value function Q stored in the value function storage unit 140. As described above, this value function Q results from an update by implementing the Q-learning by the value function update unit 122.

In step S33, the optimized behavior information output unit 150 generates optimized behavior information based on a machining condition in the state information s acquired in step S31 and the value function Q acquired in step S32. Then, the optimized behavior information output unit 150 outputs the generated optimized behavior information to a multi-core control unit 333 of the controller 300. This optimized behavior information is information for optimizing designation of a core to perform each control process and the order of performing those control processes.

Based on this optimized behavior information, the controller 300 optimizes designation of a core to perform each control process and the order of performing those control processes. As described above, use of the machine learning device 100 of this embodiment allows effective distribution of processes to be performed in a device with multiple operation units.

<Application of Optimized Behavior Information>

Figure 8:
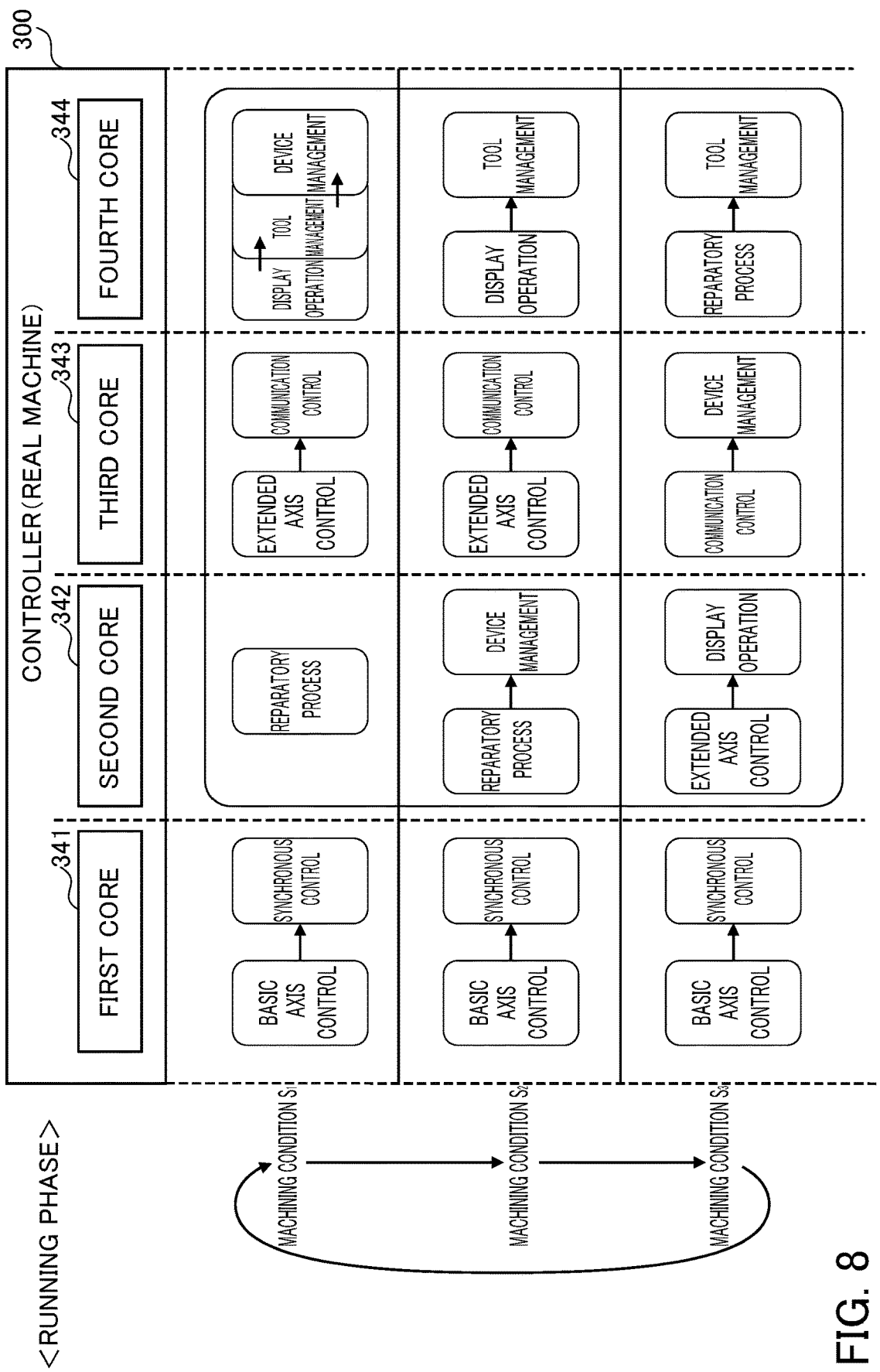
FIG. 8 is a schematic view illustrating allocation of control processes responsive to a machining condition according to the embodiment of the present invention.

The following describes a state in the controller 300 by referring to FIG. 8 where designation of a core to perform each control process and the order of performing those control processes are optimized based on optimized behavior information. This description proceeds based on the assumption that the controller 300 makes a transition between a state under a machining condition $S_1$, a state under a machining condition $S_2$, and a state under a machining condition $S_3$ repeatedly. The controller 300 inputs state information s containing a machining condition $S_n$ to the machine learning device 100. In response to this input, the machine learning device 100 provides the controller 300 with behavior information instructing allocation of an optimal core under the machining condition $S_n$. In the illustration of FIG. 8, the controller 300 provides behavior outputs as follows under the machining condition $S_n$ in an implementation state $T_n$.

<Machining Condition $S_1$>

Implementation state $T_1$: Implementation of the preparatory process in a second core 342, the extended axis control in a third core 343, and the display operation in a fourth core 344

Implementation state $T_2$: Implementation of the preparatory process in the second core 342, the communication control in the third core 343, and the display operation in the fourth core 344

Implementation state $T_3$: Implementation of the preparatory process in the second core 342, the communication control in the third core 343, and the tool management in the fourth core 344

Implementation state $T_4$: Implementation of the preparatory process in the second core 342, the communication control in the third core 343, and the device management in the fourth core 344

<Machining Condition $S_2$>

Implementation state $T_1$: Implementation of the preparatory process in the second core 342, the extended axis control in the third core 343, and the display operation in the fourth core 344

Implementation state $T_2$: Implementation of the preparatory process in the second core 342, the communication control in the third core 343, and the display operation in the fourth core 344

Implementation state $T_3$: Implementation of the preparatory process in the second core 342, the communication control in the third core 343, and the tool management in the fourth core 344

Implementation state $T_4$: Implementation of the device management in the second core 342, the communication control in the third core 343, and the tool management in the fourth core 344

<Machining Condition $S_3$>
Implementation state $T_1$: Implementation of the extended axis control in the second core 342, the communication control in the third core 343, and the preparatory process in the fourth core 344
Implementation state $T_2$: Implementation of the extended axis control in the second core 342, the device management in the third core 343, and the preparatory process in the fourth core 344
Implementation state $T_3$: Implementation of the extended axis control in the second core 342, the device management in the third core 343, and the tool management in the fourth core 344
Implementation state $T_4$: Implementation of the display operation in the second core 342, the device management in the third core 343, and the tool management in the fourth core 344 As described above, in this embodiment, allocation of a core to perform a control process and the order of performing those control processes can be optimized in response to each of multiple machining conditions.

Effects Achieved by this Embodiment

Effects achieved by this embodiment will be described in more detail. Control over a machine tool by a controller proceeds on the condition that a target axis to be controlled in real time or the priority of a process to be performed is changed considerably by a machining condition such as parameter setting, an operation mode, and a machining program for operation, for example. Unlike control by a general-purpose application, this is a feature that is characteristic to control over a machine tool.

Additionally, control over a machine tool includes not only control over axes but also control over functions to be exerted in parallel such as control over a communication function, a display function, and a signal input/output function. Hence, communication between multiple operation units and control accompanying the communication (exclusive control over the same memory, for example) may occur frequently. Thus, simply providing a uniform load causes the risk of a reduction in performance. For example, it has been difficult to solve these problems by general techniques such as those disclosed by patent documents 1 to 5.

By contrast, in this embodiment, machine learning is employed for determining a core that is optimal for performing a control process, making it possible to establish an optimal process distribution pattern that is responsive to a machining condition. Thus, this embodiment achieves the following effects, for example. First, a uniform operating state without waste can be produced by reducing the difference in operating ratio between cores. Further, the throughput of the system as a whole can be increased by reducing the volume of communication between cores and increasing throughput per unit time. Additionally, energy-saving operation can be fulfilled by reducing power consumption or an amount of heating, and failure caused by heat generation can be avoided. In these ways, this embodiment is capable of achieving more advantageous effects than what has been achieved conventionally.

<First Modification>
In the embodiment described above, for the machine learning by the machine learning device 100, a user sets a machining condition as a target of the reinforcement learning at the controller simulator 200. However, if there are many machining conditions intended to be used as targets of the reinforcement learning, inputting machining conditions one by one is complicated work for the user.

In this regard, to perform the reinforcement learning automatically using more machining conditions as targets, a machining condition generation unit that generates a machining condition in the learning phase by taking various states of a controller into consideration is added in this modification.

Figure 9:
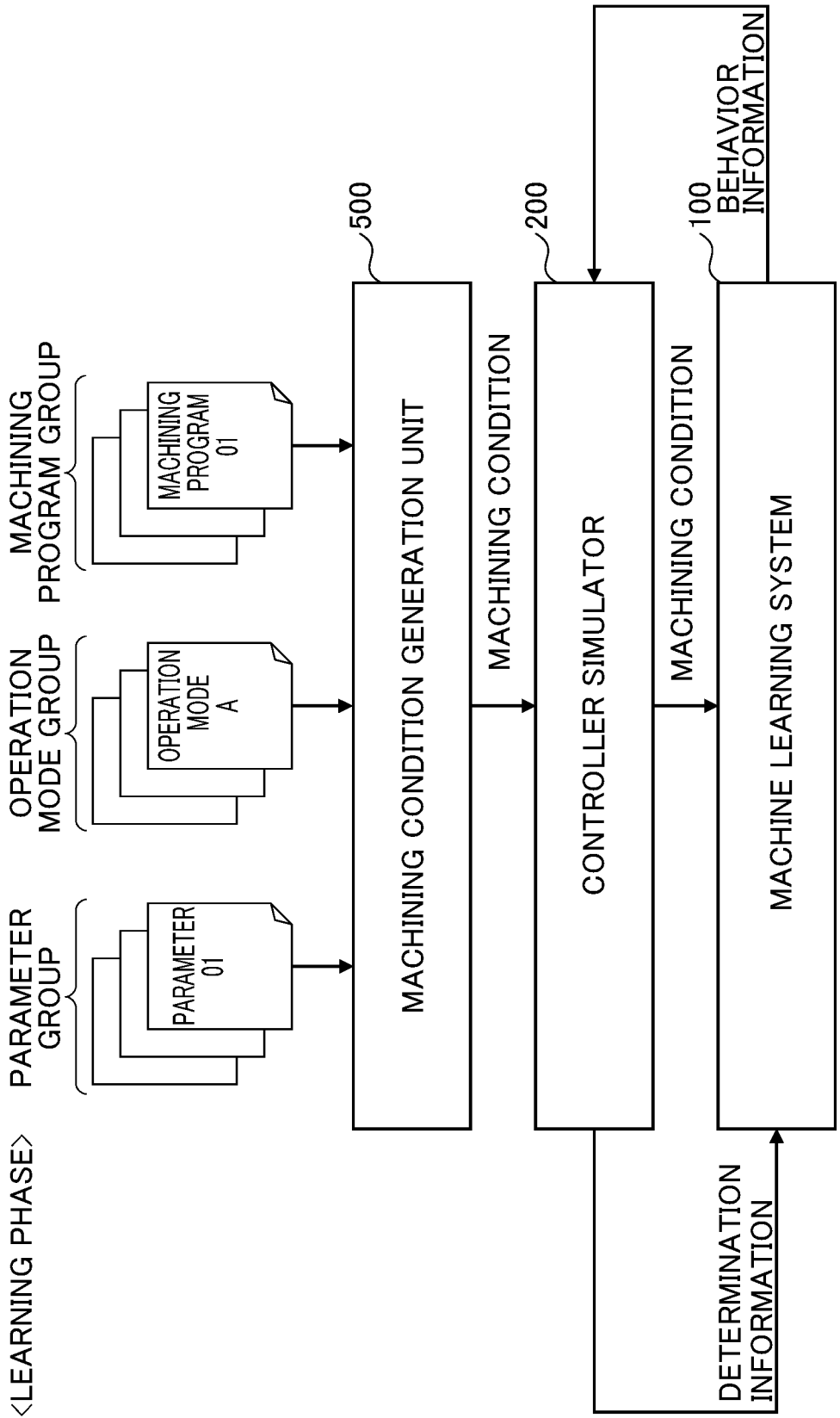
FIG. 9 is a functional block diagram illustrating a basic configuration according to a first modification of the embodiment of the present invention.

The configuration of this modification will be described by referring to FIG. 9. As illustrated in FIG. 9, in this modification, a machining condition generation unit 500 is connected to the controller simulator 200 in the learning phase. The machining condition generation unit 500 may be fulfilled as an independent device or as a functional block in the machine learning device 100.

Various types of information for generating a machining condition are input to the machining condition generation unit 500. As illustrated in FIG. 9, an example of the information to be input includes a parameter group containing multiple parameter settings, an operation mode group containing multiple operation modes, and a machining program group containing multiple machining programs.

The machining condition generation unit 500 generates a machining condition automatically by changing the content of a parameter setting, that of an operation mode, that of a machining program, and a combination thereof included in these pieces of information. The machining condition generated by the machining condition generation unit 500 is set at the controller simulator 200 and then the controller simulator 200 is operated, thereby performing the reinforcement learning under the generated machining condition. This allows the implementation of reinforcement learning under various machining conditions while the load on the user is reduced.

If the content of a parameter setting, that of an operation mode, and that of a machining program are combined completely at random, the reinforcement learning might be performed only under machining conditions that would not be used realistically. In this regard, one, or two or more realistic machining conditions generated by a user may be input to the machining condition generation unit 500. The machining condition generation unit 500 generates a machining condition by changing part of such a realistic machining condition. By doing so, only a realistic machining condition and a machining condition similar to the realistic machining condition can be used for the reinforcement learning.

<Second Modification>
If state information s containing an unknown machining condition not having been used as a target of the reinforcement learning is input in the running phase, it becomes impossible to output behavior information optimized for this unknown machining condition.

In this regard, in this modification, if state information s containing an unknown machining condition is input, the unknown machining condition is changed to a known machining condition nearest to the unknown machining condition and having been used as a target of the reinforcement learning. The known machining condition has been used as a target of the reinforcement learning. Thus, optimized behavior information can be output for this known machining condition.

Figure 10:
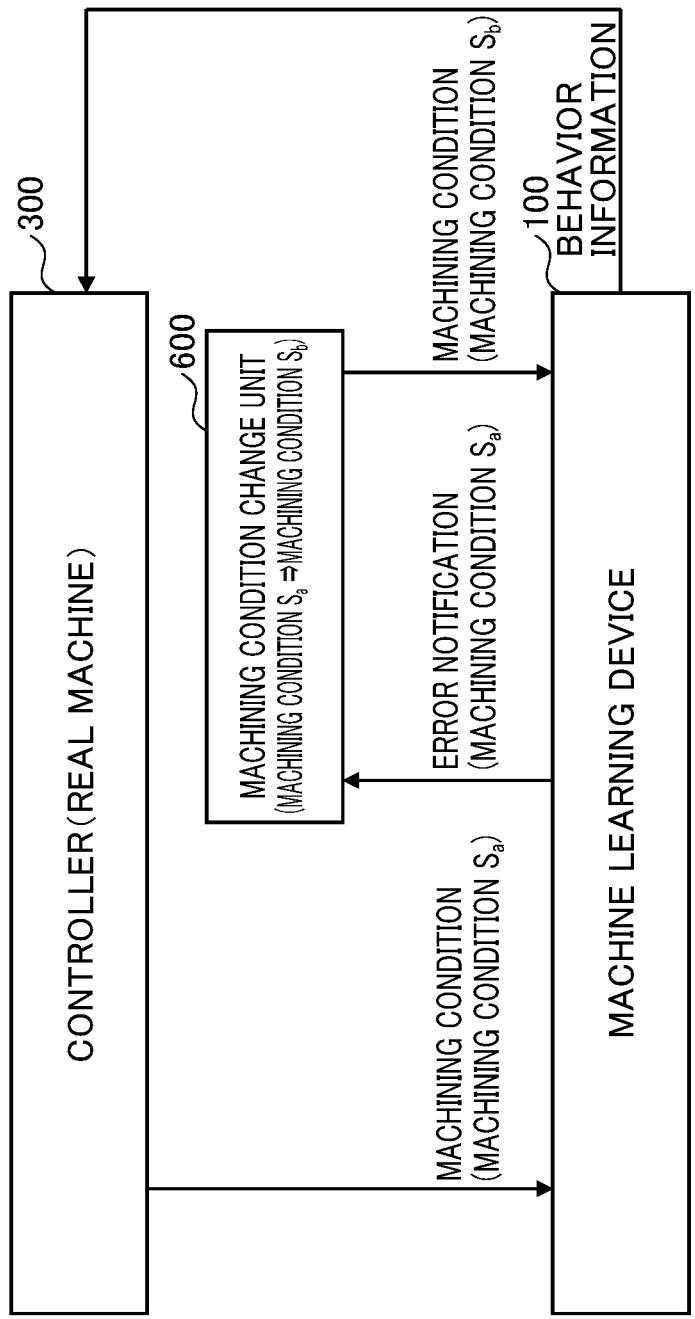
FIG. 10 is a functional block diagram illustrating a basic configuration according to a second modification of the embodiment of the present invention.

The configuration of this modification will be described by referring to FIG. 10. As illustrated in FIG. 10, in this modification, a machining condition change unit 600 is connected to the controller simulator 200 in the running phase. The machining condition change unit 600 may be fulfilled as an independent device or as a functional block in the machine learning device 100.

If state information s containing an unknown machining condition (machining condition $S_a$, for example) is input to the machine learning device 100, the machine learning device 100 notifies the machining condition change unit 600 of an error containing the content of the machining condition. In response to the receipt of this notification, the machining condition change unit 600 outputs a known machining condition (machining condition $S_b$, for example) nearest to the unknown machining condition (machining condition $S_a$, for example) and having been used as a target of the reinforcement learning to the machine learning device 100. The machining condition change unit 600 selects a machining condition nearest to an unknown machining condition from known machining conditions by a method described below by referring to FIG. 11.

In a specific example illustrated in FIG. 11, a machining condition nearest to an unknown machining condition $S_a$ is selected from a known machining condition $S_b$, a known machining condition $S_c$, and a known machining condition $S_d$. As described above, a machining condition contains various types of information. Such various types of information include an operation mode, a machining program, and the operating status of cores, and these types of information desirably match the corresponding types of information in the machining condition $S_a$. Thus, the machining condition $S_c$, which is different from the unknown machining condition $S_a$ in terms of the operating status of cores, is excluded as a candidate for selection.

Next, the machining conditions are compared in each item of a parameter setting. Then, the machining condition $S_b$ having a largest number of items matching the items in the unknown machining condition $S_a$ is considered to be a machining condition nearest to the machining condition $S_a$. An item used as information for the comparison can be selected freely in response to setting by a user, for example.

Selection may be made by weighting each item instead of making a selection based only on the number of matching items. For example, weighting may be set so as to give five points if there is a match in the number of controlled axes, three points if there is a match in the number of spindles, etc. A similar machining condition may be determined based on a total of the points.

Further, CPU load generally exhibits similar tendencies as there is a closer match in the number of controlled axes, a valid function, or an invalid function. Thus, these parameter settings may be used as targets of the comparison or be given heavier weights.

If there is no match in an operation mode, a machining program, and the operating status of cores, or if there are not many matching parameter setting items, for example, it may be determined that there is no similar machining condition. In this case, a choice of exerting control without using the machine learning device 100 may be given to a user.

<Third Modification>

In the embodiment described above, the machine learning device 100, the controller simulator 200, and the controller 300 are constructed using separate devices. Alternatively, some or all of the functions of these separate devices may be fulfilled by one device.

Part or all of the functions of the machine learning device 100, that of the controller simulator 200, and that of the controller 300 may be fulfilled by multiple devices. In this case, a distributed processing system may be applicable in which the respective functions of the machine learning device 100, the controller simulator 200, and the controller 300 are distributed appropriately in multiple servers. Alternatively, a virtual server function, etc. may be used in the cloud.

EXPLANATION OF REFERENCE NUMERALS

1 Machine learning system
100 Machine learning device
110 State information acquisition unit
120 Learning unit
121 Reward calculation unit
122 Value function update unit
123 Behavior information generation unit
130 Behavior information output unit
140 Value function storage unit
150 Optimized behavior information output unit
200 Controller simulator
210, 310 First control process group
220, 320 Second control process group
230, 330 Operating system
231, 331 Monitoring unit
232, 332 First multi-core control unit
233, 333 Second multi-core control unit
240, 340 Processor
241, 341 First core
242, 342 Second core
243, 343 Third core
244, 344 Fourth core
300 Controller
400 Machine tool
500 Machining condition generation unit
600 Machining condition change unit

What is claimed is:

1. A machine learning device that performs reinforcement learning on a controller that performs multiple processes in parallel at multiple operation units for controlling a machine tool, the controller including a first multi-core control unit exerting asymmetrical multi-processing (AMP) control of fixing an operation unit to perform a process and a second multi-core control unit exerting symmetrical multi-processing (SMP) control of not fixing an operation unit to perform a process, the machine learning device comprising:
a memory configured to store a program; and
a processor configured to execute the program and control the machine learning device to:
output behavior information containing allocation of arithmetic units that perform the multiple processes to the controller;
acquire state information containing a machining condition as a condition for machining set at the machine tool and determination information generated by monitoring an implementation of the multiple processes by the multiple operation units based on the allocation in the behavior information;
calculate a value of a reward to be given by the reinforcement learning based on the determination information in the state information; and
update a behavior value function based on the value of a reward, the state information, and the behavior information.

2. The machine learning device according to claim 1, wherein
the multiple operation units perform the multiple processes a predetermined number of times in predetermined divided cycles,
the processor is further configured to control the machine learning device to update the behavior value function each time the multiple processes are finished in the multiple operation units, and the processor is further configured to control the machine learning device to output behavior information containing changed allocation to the controller each time the multiple processes are finished in the multiple operation units.

3. The machine learning device according to claim 2, wherein the allocation in the behavior information contains designation of a process to be performed by each of the multiple operation units and an order of performing the processes, and the behavior information containing changed allocation output to the controller is behavior information in which at least one of the designation of a process to be performed by each of the multiple operation units and the order of performing the processes is changed.

4. The machine learning device according to claim 2, wherein a process to be allocated for any of the multiple operation units is fixed, and the behavior information containing changed allocation output is behavior information in which the changed allocation pertains to an operation unit for which allocation of a process is not fixed.

5. The machine learning device according to claim 1, wherein the reinforcement learning by the machine learning device is performed on the controller as a duplicate that is virtually made by a simulator, and the processor is further configured to control the machine learning device to generate the behavior information based on state information acquired from a real machine of the controller and a behavior value function learned by the reinforcement learning, and output the generated behavior information to the real machine of the controller after the reinforcement learning is finished.

6. The machine learning device according to claim 5, wherein if a machining condition in the state information acquired from the real machine of the controller is a machining condition not having been used as a target of the reinforcement learning, the processor is further configured to control the machine learning device to change the machining condition to a different machining condition having a partially matching content and having been used as a target of the reinforcement learning, and the processor is further configured to control the machine learning device to generate the behavior information based on changed state information containing the machining condition and a behavior value function learned by the reinforcement learning responsive to the different machining condition and outputs the generated behavior information to the real machine of the controller.

7. The machine learning device according to claim 1, wherein the processor is further configured to control the machine learning device to generate the machining condition and set the generated machining condition at the controller.

8. A controller that performs multiple processes for controlling a machine tool in parallel at multiple operation units and comprises the machine learning device according to claim 1.

9. A non-transitory computer-readable medium storing a machine learning program that causes a processor of a machine learning device that performs reinforcement learning on a controller, including a first multi-core control unit exerting asymmetrical multi-processing (AMP) control of fixing an operation unit to perform a process and a second multi-core control unit exerting symmetrical multi-processing (SMP) control of not fixing an operation unit to perform a process, that performs multiple processes in parallel at multiple operation units for controlling a machine tool to execute:

outputting behavior information containing allocation of arithmetic units that perform the multiple processes to the controller;

acquiring state information containing a machining condition as a condition for machining set at the machine tool and determination information generated by monitoring an implementation of the multiple processes by the multiple operation units based on the allocation in the behavior information;

calculating a value of a reward to be given by the reinforcement learning based on the determination information in the state information; and updating a behavior value function based on the value of a reward, the state information, and the behavior information.

* * * * *